(12) United States Patent
Yano (10) Patent No.: US 6,731,870 B2
(45) Date of Patent: May 4, 2004

(54) FLASH DEVICE

(75) Inventor: Takaaki Yano, Hokkaido (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/603,774

(22) Filed: Jun. 26, 2003

(65) Prior Publication Data

US 2004/0062538 A1 Apr. 1, 2004

(30) Foreign Application Priority Data

Jun. 28, 2002 (JP) ........................................ 2002-189156

(51) Int. Cl.[7] .............................................. G03B 15/03
(52) U.S. Cl. ........................... 396/175; 396/200; 362/18
(58) Field of Search ........................... 396/62, 175, 200; 362/16–18

(56) References Cited

U.S. PATENT DOCUMENTS

| | | | | |
|---|---|---|---|---|
| 4,821,053 A | * | 4/1989 | Dowe et al. ................. | 396/175 |
| 5,160,192 A | | 11/1992 | Sugawara ..................... | 362/16 |
| 5,584,572 A | * | 12/1996 | Ishikawa ..................... | 362/346 |
| 5,734,934 A | * | 3/1998 | Horinishi et al. ............. | 396/62 |
| 6,598,986 B2 | | 7/2003 | Yano ........................... | 362/18 |

FOREIGN PATENT DOCUMENTS

| | | | | |
|---|---|---|---|---|
| JP | 1236504 | 9/1989 | ........... | F21V/13/04 |
| JP | 1239540 | 9/1989 | ........... | G03B/15/03 |
| JP | 1239541 | 9/1989 | ........... | G03B/15/03 |
| JP | 3220537 | 9/1991 | ........... | G03B/15/02 |

OTHER PUBLICATIONS

English Language Translation of JP Appln. No. 1–236504.
English Language Translation of JP Appln. No. 1–239540.
English Language Translation of JP Appln. No. 1–239541.
English Language Translation of JP Appln. No. 3–220537.

* cited by examiner

*Primary Examiner*—W. B. Perkey
(74) *Attorney, Agent, or Firm*—Greenblum & Bernstein, P.L.C.

(57) ABSTRACT

A flash device includes a flash tube; a reflector having a first reflector portion and a second reflector portion which are arranged symmetrically with respect to a plane including an axis of the flash tube, a space between the first reflector portion and the second reflector portion increasing in a direction toward a front end aperture of the reflector; and a lens positioned so as to be opposed to the front end aperture of the reflector. At least a part of the first reflector portion on a side of said front end aperture and at least a part of the second reflector portion on a side of said front end aperture are interlocked with each other to be movable in opposite directions along a direction perpendicular to the plane.

4 Claims, 8 Drawing Sheets

Prior Art

Fig. 8B

Prior Art

FLASH DEVICE

BACKGROUND OF THE INVENTION

1. Field of the Invention

The present invention relates to a flash device which can adjust the flash coverage or luminous intensity distribution characteristic in accordance with, e.g., the focal length of a zoom lens in use.

2. Description of the Related Art

Figure 8A:
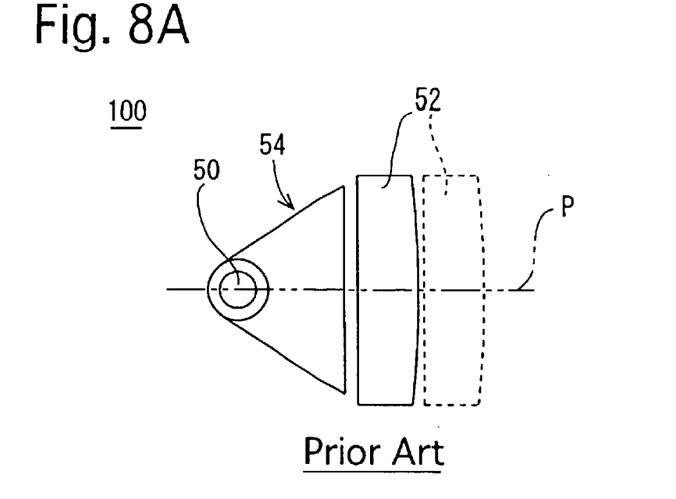
FIG. 8A is a side internal view of a conventional zoom flash device.
Figure 8B:
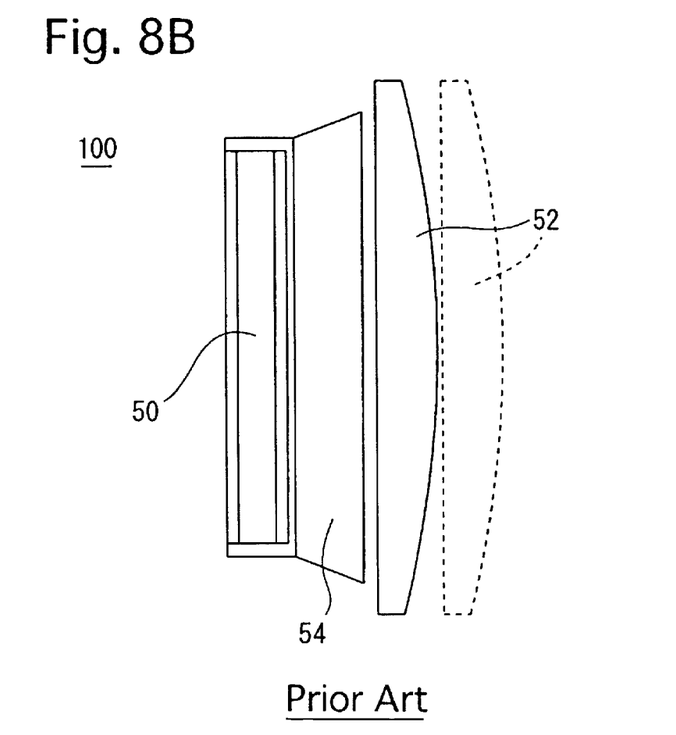
FIG. 8B is an internal top view of the conventional zoom flash device shown in FIG. 8A.

FIGS. 8A and 8B show a typical (conventional) zoom flash device 100. The zoom flash device 100 has a flash tube 50, a lens 52 and a reflector 54. One of the lens 52 and the reflector 54 is moved relative to the other along an optical axis of the zoom flash device 100 to change the space between the lens 52 and the reflector 54 to adjust the flash coverage (luminous intensity distribution) in accordance with the focal length (angle of view) of a zoom lens (not shown).

The structure of such a conventional zoom flash device is unfavorable with respect to the recent tendency of miniaturization of cameras because a sufficient space allowing one of the lens 52 and the reflector 54 to move relative to the other needs to be provided between lens 52 and the reflector 54.

In addition, if such a space between the lens 52 and the reflector 54 is large, vignetting occurs. Namely, a portion of the flash light reflected by the reflector 54 is obstructed by the edge of the aperture of the lens 52, thus not exiting out of an exit surface (front surface) of the lens 52. This problem of vignetting is noticeable, especially with the marginal rays of flash light that pass through the perimeter of the lens 52, thus causing a reduction in luminous intensity of the marginal rays of flash light.

SUMMARY OF THE INVENTION

The present invention provides a flash device which can adjust the flash coverage without changing the space between the lens and the reflector with a minimum reduction in luminous intensity of the marginal rays of flash light. Other aspects and advantages of the present invention will become apparent to one skilled in the art by reading the following disclosure and the appended claims.

According to an aspect of the present invention, a flash device is provided, including a flash tube; a reflector having a first reflector portion and a second reflector portion which are arranged symmetrically with respect to a plane including an axis of the flash tube, a space between the first reflector portion and the second reflector portion increasing in a direction toward a front end aperture of the reflector; and a lens positioned so as to be opposed to the front end aperture of the reflector. At least a part of the first reflector portion on a side of said front end aperture and at least a part of the second reflector portion on a side of said front end aperture are interlocked with each other to be movable in opposite directions along a direction perpendicular to the plane.

It is desirable for the part of the first reflector portion and the part of the second reflector portion to parallel-translate in the opposite directions.

It is desirable for the first reflector portion to include a first rear stationary reflector and a first front movable reflector. The second reflector portion includes a second rear stationary reflector and a second front movable reflector. The first front movable reflector and the second front movable reflector are interlocked with each other to be movable in the opposite directions along the direction perpendicular to the plane. The first and second front movable reflectors parallel-translate in the opposite directions.

The reflector can include two end reflector plate portions positioned at opposite ends of the flash tube, respective front ends of the two end reflector plate portions, the first reflector portion and the second reflector portion forming a substantially rectangular front end aperture of the reflector.

The present disclosure relates to subject matter contained in Japanese Patent Application No. 2002-189156 (filed on Jun. 28, 2002) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

FIGS. 1 and 2A through 2C show an embodiment of a flash device according to the present invention. The flash device 10, which can serve as a zoom flash device for a camera using a zoom lens, is provided with a flash tube 1 serving as a light source, a lens 3 and a reflector 5.

Figure 1:
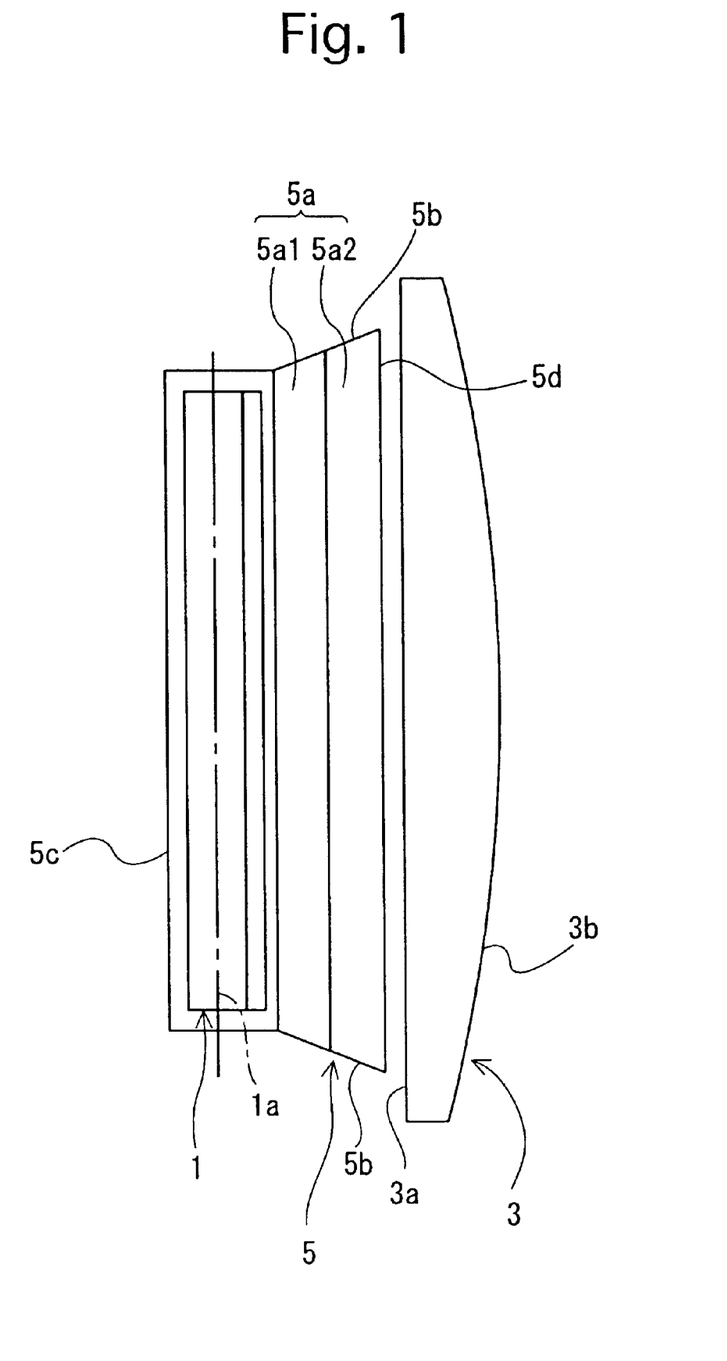
FIG. 1 is an internal top view of an embodiment of a flash device according to the present invention.

The flash tube 1 is, e.g., a xenon flash tube, and is supplied with power from a power source (not shown) to discharge flash light from the entire peripheral surface of the tube.

The lens 3 is a Fresnel lens made of a synthetic resin, e.g., PMMA (polymethylmethacrylate). The lens 3 has a substantially rectangular shape as viewed from front of the lens 3. A front surface 3b of the lens 3 is formed as a convex surface while a rear surface 3a of the same is formed as a Fresnel lens surface having a concentric series of simple lens sections. The lens 3 is positioned in front of the flash tube 1 so that the Fresnel lens surface 3a faces the flash tube 1. The convex surface 3b is formed as a spherical surface or a rotationally symmetrical aspherical surface. The lateral edges (horizontal edges) of the Fresnel lens surface 3a extend parallel to an axis 1a of the flash tube 1.

The reflector 5 is provided with a pair of lateral reflector plate portions (upper and lower lateral reflector plate portions) 5a arranged symmetrically with respect to a horizontal plane including the axis 1a of the flash tube 1, and a pair of end reflector plate portions 5b positioned at opposite ends of the flash tube 1. The flash tube 1 is positioned in a flash-tube accommodation portion 5c formed by the pair of lateral reflector plate portions 5a and the pair of end reflector plate portions 5b. A rear end of each lateral reflector plate portion 5a is curved along a periphery of the flash-tube accommodation portion 5c having a substantially half circular cross section to be smoothly connected to the flash-tube accommodation portion 5c, and a front end of each lateral reflector plate portion 5a extends forward from the flash tube 1 to a rectangular front end aperture (discharge aperture) 5d of the reflector 5. Inner surfaces of the pair of lateral reflector plate portions 5a and the pair of end reflector portions 5b (and also an inner surface the reflector 5 in the flash-tube accommodation portion 5c) are formed as mirror-finished surfaces such as aluminum-evaporated mirror surfaces. A portion of the flash light emitted from the flash tube 1 that is positioned in the flash-tube accommodation portion 5c is incident directly on the lens 3 through the front end aperture 5d, and another portion of the flash light emitted from the flash tube 1 is incident on the lens 3 through the front end aperture 5d after being reflected by the pair of lateral reflector plate portions 5a or the pair of end reflector portions 5b. Another portion of the flash light emitted from the flash tube 1 is reflected by firstly an inner surface of the reflector 5 in the flash-tube accommodation portion 5c and subsequently the pair of lateral reflector plate portions 5a or the pair of end reflector portions 5b before being incident on the lens 3 through the front end aperture 5d. Another portion of the flash light emitted from the flash tube 1 is reflected by an inner surface of the reflector 5 in the flash-tube accommodation portion 5c to be incident on the lens 3 through the front end aperture 5d without being reflected by either the pair of lateral reflector plate portions 5a or the pair of end reflector portions 5b. Rays of flash light which enter the lens 3 from the Fresnel lens surface 3a are converged through the lens 3 to be discharged out of the convex surface 3a toward the object which is to be illuminated by the flash device 10.

Each of the pair of lateral reflector plate portions 5a has two parts: a rear stationary reflector 5a1 and a front movable reflector 5a2. The pair of front movable reflectors 5a2, i.e., the upper front movable reflector 5a2 and the lower front movable reflector 5a2 are guided by a guiding mechanism (not shown) along a direction orthogonal to a horizontal plane including the axis 1a of the flash tube 1 so that each front movable reflector 5a2 can parallel-translate in a direction perpendicular to the axis 1a of the flash tube 1 (i.e., along a vertical direction as viewed in FIGS. 2A through 2C). Moreover, the upper front movable reflector 5a2 and the lower front movable reflector 5a2 are interlocked with each other via an interlocking mechanism (not shown) to be movable in opposite directions by the same amount of movement. Although not illustrated in the drawings, the guiding mechanism and the interlocking mechanism can be easily made by a person skilled in the art.

Figure 2A:
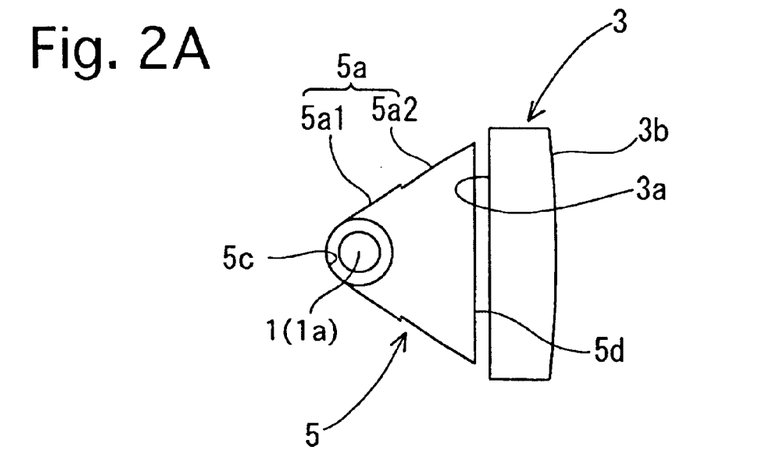
FIG. 2A is a side internal view of the flash device shown in FIG. 1, showing a state where an upper front movable reflector has been parallel-translated down from its initial position while a lower front movable reflector has been parallel-translated up from its initial position.
Figure 2B:
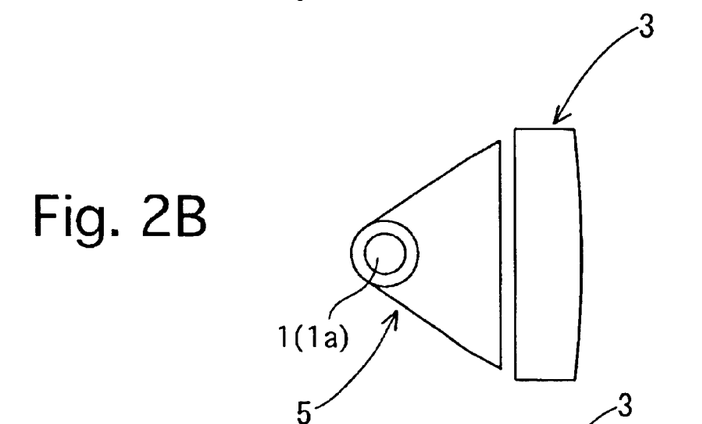
FIG. 2B is a view similar to that of FIG. 2A, showing a state where the upper and lower front movable reflectors are positioned in their respective initial positions.
Figure 2C:
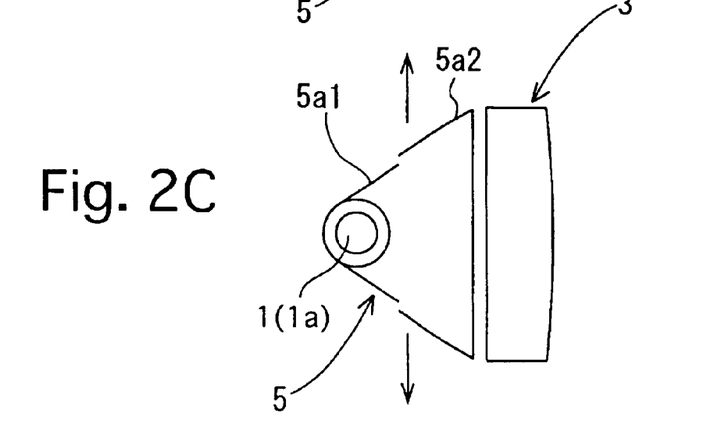
FIG. 2C is a view similar to that of FIG. 2A, showing a state where the upper front movable reflector has been parallel-translated up from the initial position while the lower front movable reflector has been parallel-translated down from the initial position.

FIG. 2A shows a state where the upper and lower front movable reflectors 5a2 have been moved in opposite directions to approach each other with respect to a horizontal plane including the axis 1a of the flash tube 1. FIG. 2C shows a state where the upper and lower front movable reflectors 5a2 have been moved in opposite directions away from each other with respect to the above-mentioned horizontal plane. FIG. 2B shows a state where the upper and lower front movable reflectors 5a2 are positioned in respective initial positions thereof. In the state shown in FIG. 2B, the upper rear movable reflector 5a1 and the upper front movable reflector 5a2 are flush with each other to form a continuous reflector surface, and also the lower rear movable reflector 5a1 and the lower front movable reflector 5a2 are flush with each other to form a continuous reflector surface. The amount of movement of the upper front movable reflector 5a2 and the amount of movement of the lower front movable reflector 5a2 from the respective initial positions thereof are the same at all times.

An example of the dimensions of the above described fundamental elements of the flash device 10 is as follows. The diameter of the flash tube 1 is 2.3 mm. The length of the flash tube 1 is 15 mm. The distance between the axis 1a of the flash tube I and the Fresnel lens surface 3a is 4.5 mm. The distance between the front end aperture 5d of the reflector 5 and the Fresnel lens surface 3a is 0.5 mm. The height and the length of the lens 3 are 8.7 mm and 20.4 mm, respectively. The length of each of the pair of lateral reflector plate portions 5a in an optical axis direction of the lens 3 (horizontal direction as viewed in FIG. 2A) between the axis 1a and the front end aperture 5d is 4.0 mm. The length of each front movable reflector 5a2 in the optical axis direction of the lens 3 is 2.5 mm. This example of the dimensions of the above described fundamental elements of the flash device 10 does not limit the scope of the present invention.

Figure 3A:
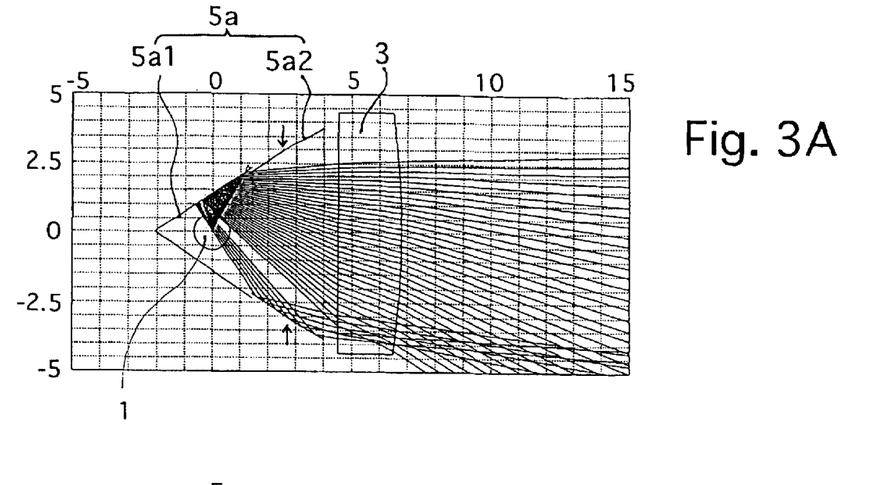
FIG. 3A is a diagram showing rays of flash light of the flash device in a state shown in FIG. 2A.
Figure 3B:
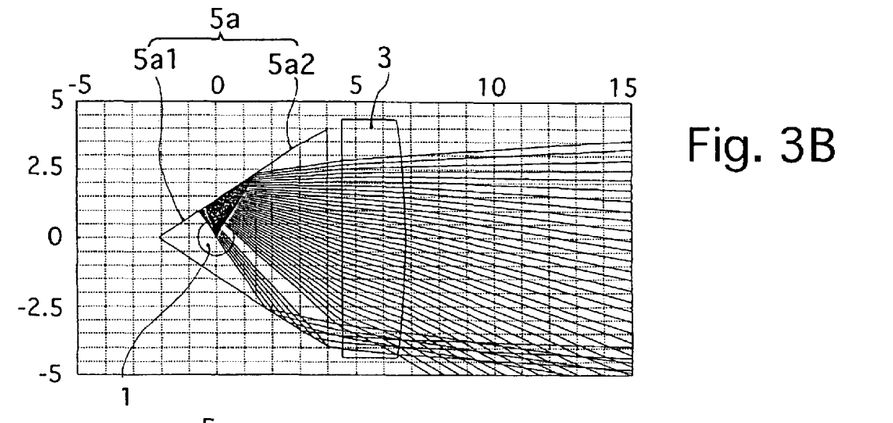
FIG. 3B is a diagram showing rays of flash light of the flash device in a state shown in FIG. 2B.
Figure 3C:
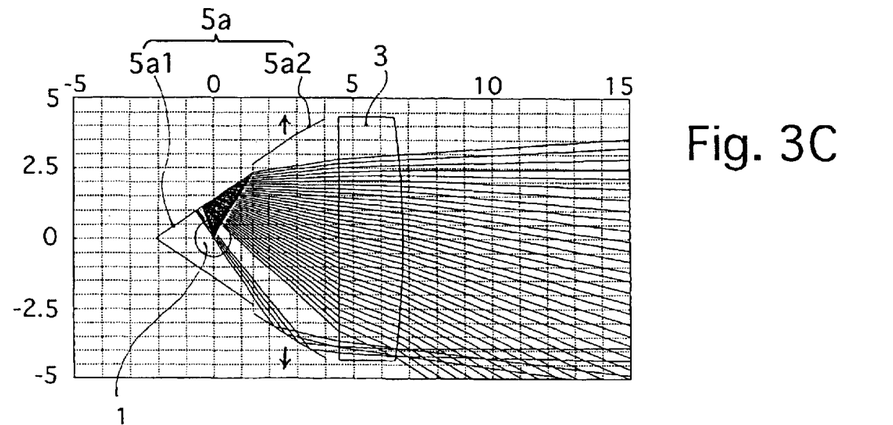
FIG. 3C is a diagram showing rays of flash light of the flash device in a state shown in FIG. 2C.
Figure 4A:
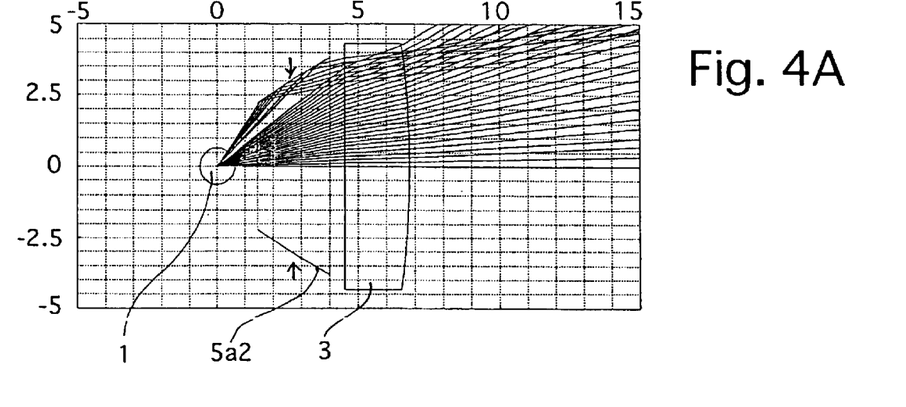
FIG. 4A is a diagram showing rays of flash light of the flash device in a state shown in FIG. 2A.
Figure 4B:
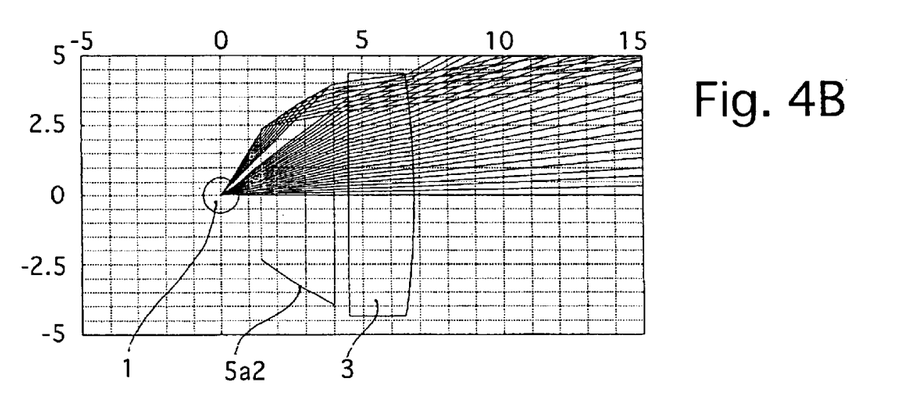
FIG. 4B is a diagram showing rays of flash light of the flash device in a state shown in FIG. 2B.
Figure 4C:
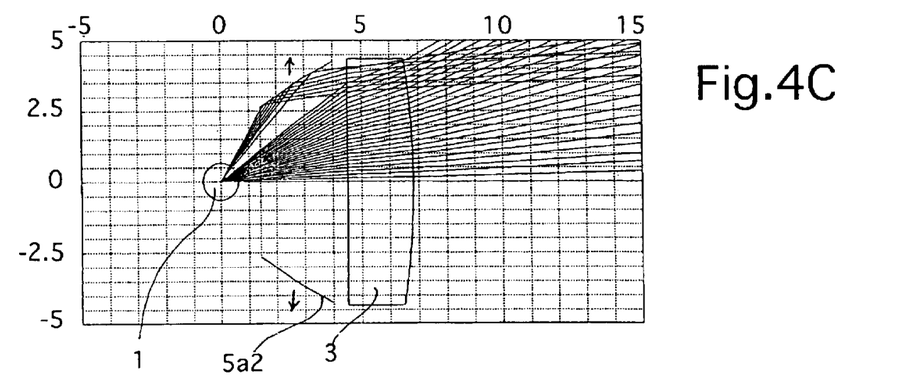
FIG. 4C is a diagram showing rays of flash light of the flash device in a state shown in FIG. 2C.
Figure 5A:
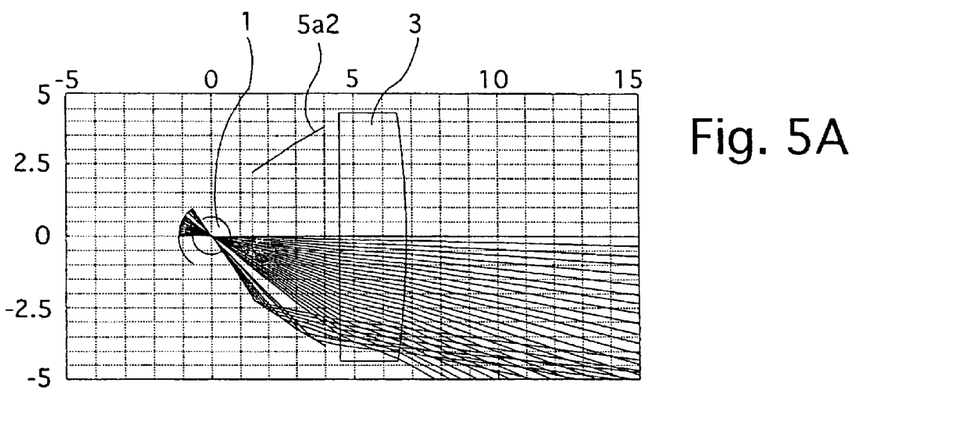
FIG. 5A is a diagram showing rays of flash light of the flash device in a state shown in FIG. 2A.
Figure 5B:
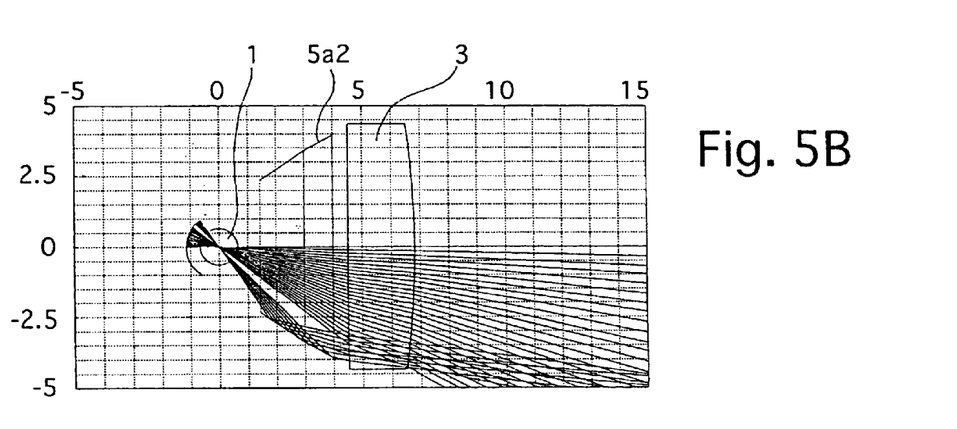
FIG. 5B is a diagram showing rays of flash light of the flash device in a state shown in FIG. 2B.
Figure 5C:
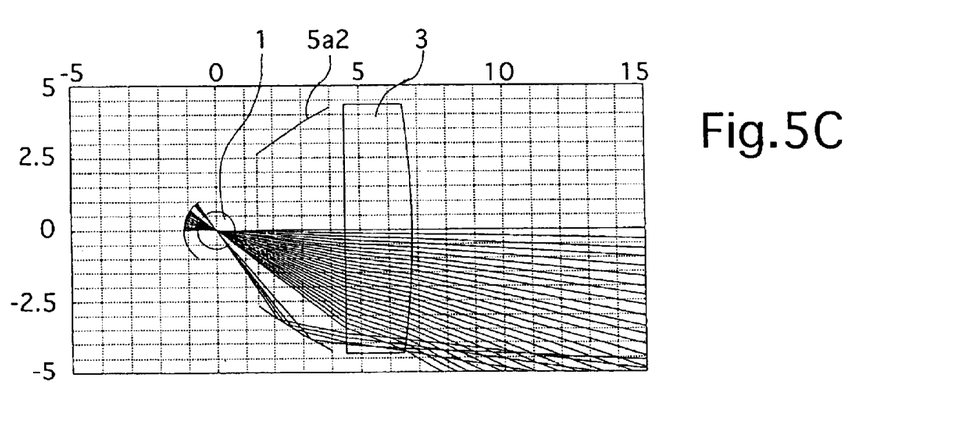
FIG. 5C is a diagram showing rays of flash light of the flash device in a state shown in FIG. 2C.

FIGS. 3A, 4A and 5A are diagrams showing rays of flash light of the flash device 10 in a state shown in FIG. 2A, in which the upper and lower front movable reflectors 5a2 have been moved in opposite directions to approach each other with respect to a horizontal plane including the axis 1a of the flash tube 1. FIGS. 3B, 4B and 5B are diagrams showing rays of flash light of the flash device 10 in a state shown in FIG. 2B, in which the upper and lower front movable reflectors 5a2 are positioned in the initial positions thereof. FIGS. 3C, 4C and 5C are diagrams showing rays of flash light of the flash device 10 in a state shown in FIG. 2C, in which the upper and lower front movable reflectors 5a2 have been moved in opposite directions away from each other with respect to a horizontal plane including the axis 1a of the flash tube 1. In each of the diagrams shown in FIGS. 3A through 5C, the rays of flash light emitted from the flash tube 1 are illustrated as straight lines spreading out from the axis 1a as a point of origin on a plane orthogonal to the axis 1a, and the shapes of each rear stationary reflector 5a1 and each front movable reflector 5a2 are simplified for the purpose of illustration. In FIGS. 4A through 5C, the pair of rear stationary reflectors 5a1 are not illustrated for the purpose of simplifying the diagrams.

In each of FIGS. 3A, 3B and 3C, the rays of flash light emitted from the flash tube 1 which are firstly reflected by a flat reflecting surface portion of the upper rear stationary reflector 5a1 to be incident on the lens 3 are illustrated, wherein the rays of flash light emitted from the flash tube 1 which are firstly reflected by a flat reflecting surface portion of the lower rear stationary reflector 5a1 to be incident on the lens 3 are not illustrated for the purpose of simplifying the diagram. In each of FIGS. 4A, 4B and 4C, an upper half of the rays of flash light emitted from the flash tube 1 which are directly incident on the lens 3 without being reflected by the reflector 5 and an upper half of the rays of flash light emitted from the flash tube 1 which are firstly reflected by a flat reflecting surface portion of the upper front movable reflector 5a2 and subsequently incident on the lens 3 are illustrated, wherein a lower half of those rays of flash light emitted from the flash tube 1 which are directly incident on the lens 3 without being reflected by the reflector 5 and a lower half of those rays of flash light emitted from the flash tube 1 which are firstly reflected by a flat reflecting surface portion of the lower front movable reflector 5a2 and subsequently incident on the lens 3 are not illustrated for the purpose of simplifying the diagram. In each of FIGS. 5A, 5B and 5C, the rays of flash light emitted from the flash tube 1 which are firstly reflected by a curved rear end (having a substantially half circular cross section) of the upper lateral reflector plate portion 5a to be incident on the lens 3 are illustrated, wherein the rays of flash light emitted from the flash tube 1 which are firstly reflected by a curved rear end (having a substantially half circular cross section) of the lower lateral reflector plate portion 5a to be incident on the lens 3 are not illustrated for the purpose of simplifying the diagram. Among the rays of flash light shown in each of FIGS. 5A, 5B and 5C, a majority of the rays of flash light are firstly reflected by the curved rear end of the upper lateral reflector plate portion 5a and subsequently incident on the lens 3, and the remaining rays of flash light are firstly reflected by the curved rear end of the upper lateral reflector plate portion 5a and subsequently reflected by the lower front movable reflector 5a2 before being incident on the lens 3. In each of FIGS. 3A through 5C, the rays of flash light emitted from the flash tube 1 which are obstructed by the edge of the aperture of the lens 3, thus not exiting out of the convex surface 3b are not illustrated. All the rays of flash light shown in FIGS. 3A through 5C which are emitted from the flash tube 1 are discharged out of the flash device 10 at the same time.

As can be seen from the diagrams shown in FIGS. 3A through 3C, the traveling paths of the rays of flash light emitted from the flash tube 1 which are firstly reflected by respective flat reflecting surface portions of the pair of rear stationary reflectors 5a1 and subsequently incident on the lens 3 without being reflected by the pair of front movable reflectors 5a2 are invariant regardless of the variations of the space between the pair of front movable reflectors 5a2, whereas the traveling paths of the rays of flash light emitted from the flash tube 1 which are firstly reflected by respective flat reflecting surface portions of the pair of rear stationary reflectors 5a1 and subsequently reflected by the pair of front movable reflectors 5a2 before being incident on the lens 3 change in accordance with the variations of the space between the pair of front movable reflectors 5a2. In the case shown in FIGS. 3A, 4A and 5A in which the upper and lower front movable reflectors 5a2 have been moved in opposite directions to narrow the space therebetween, the rays of flash light reflected by the pair of front movable reflectors 5a2 are incident on the lens 3 on a portion thereof sufficiently apart from the perimeter of the lens 3 toward the optical axis of the lens 3, and are therefore refracted little by the lens 3. On the other hand, in the case shown in FIGS. 3C, 4C and 5C in which the upper and lower front movable reflectors 5a2 have been moved in opposite directions to widen the space therebetween, the rays of flash light reflected by the pair of front movable reflectors 5a2 are incident on the lens 3 on the perimeter thereof, and are therefore refracted by the lens 3 at a greater angle of refraction than in the case shown in FIGS. 3A, 4A and 5A. Therefore, in the case shown in FIGS. 3A, 4A and 5A, the rays of flash light reflected by the pair of front movable reflectors 5a2 are more diverging than those shown in FIGS. 3C, 4C and 5C. In other words, in the case shown in FIGS. 3C, 4C and 5C, the rays of flash light reflected by the pair of front movable reflectors 5a2 are less diverging than those shown in FIGS. 3C, 4C and 5C. Accordingly, it can be understood from the above descriptions that the luminous intensity distribution (flash coverage) of the flash light discharged out of the flash device 10 can be adjusted by parallel-translating the pair of front movable reflectors 5a2 in opposite directions from each other.

Figure 6A:
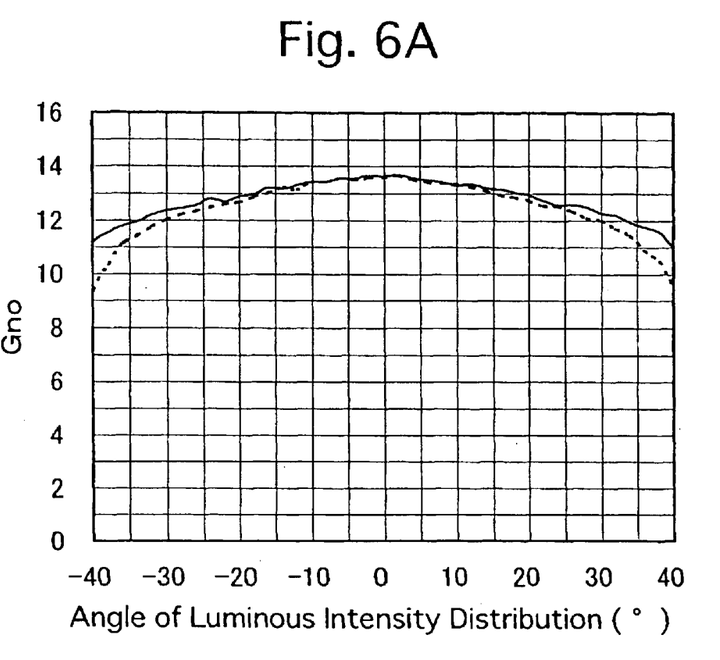
FIG. 6A is a graph showing a curve representing the variation of the guide number in a lateral direction of the flash device, and a comparative curve of a conventional flash device.
Figure 6B:
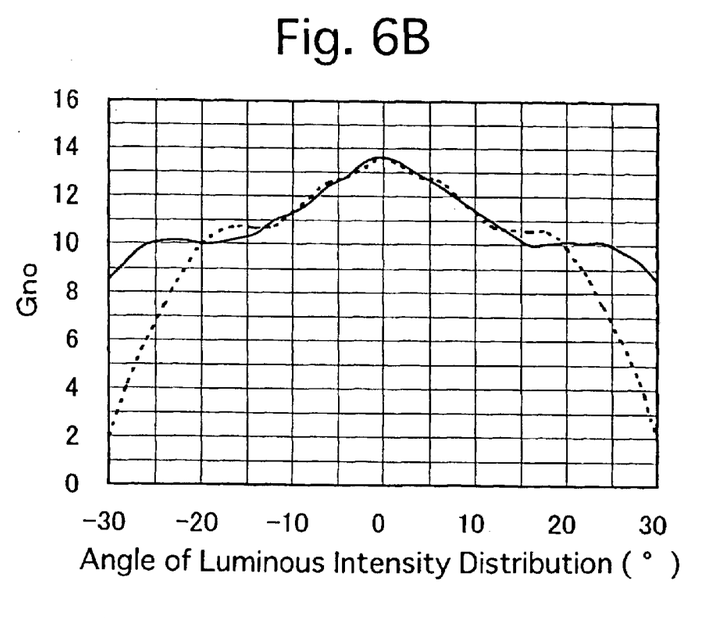
FIG. 6B is a graph showing a curve representing the variation of the guide number in a vertical direction of the flash device, and a comparative curve of a conventional flash device.

FIG. 6A shows a curve (indicated by a solid line) representing the variation of the guide number (Gno) in a lateral direction of the flash device 10 when the upper and lower front movable reflectors 5a2 have been parallel-translated to widen the space therebetween, and a comparative curve (indicated by a broken line) representing the variation of the guide number (Gno) in a lateral direction of the conventional flash device 100 shown in FIGS. 8A and 8B when the lens 52 has been parallel-translated instead of the reflector 54 being moved to obtain an angle of luminous intensity distribution similar to that obtained by the flash device 10. FIG. 6B shows a curve (indicated by a solid line) representing the variation of the guide number (Gno) in a vertical direction of the flash device 10 when the upper and lower front movable reflectors 5a2 have been parallel-translated to widen the space therebetween, and a comparative curve (indicated by a broken line) representing the variation of the guide number (Gno) in a vertical direction of the conventional flash device 100 shown in FIGS. 8A and 8B when the lens 52 has been parallel-translated instead of the reflector 54 being moved to obtain an angle of luminous intensity distribution similar to that obtained by the flash device 10. In FIGS. 6A and 6B, the horizontal axis represents the angle of luminous intensity distribution when the center of the lens is taken as an point of origin, while the vertical axis represents the guide number.

As can be understood from FIGS. 6A and 6B, the guide number steeply drops in opposite directions away from the point of origin (i.e., from a central portion of the flash coverage of the flash device) in the case of the conventional flash device 100. This problem can be considered to arise due to the fact that a portion of the flash light reflected by the reflector 54 passes through a gap between the reflector 54 and the lens 52 and is therefore not incident on the lens 52 to thereby cause a reduction in luminous intensity of the marginal rays of flash light when the space between the lens 52 and the reflector 54 is great in the conventional flash device 100. However, as can be understood from FIGS. 6A and 6B, the guide number does not steeply drop in opposite directions away from the point of origin in the present embodiment of the flash device 10.

Figure 7A:
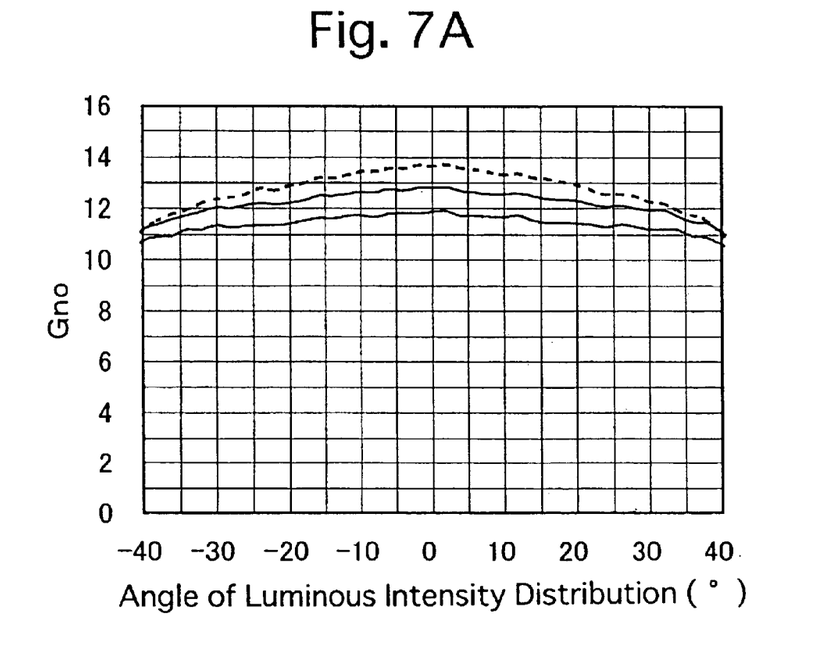
FIG. 7A is a graph showing three different curves each representing the variation of guide number in a lateral direction of the flash device shown in FIG. 1.
Figure 7B:
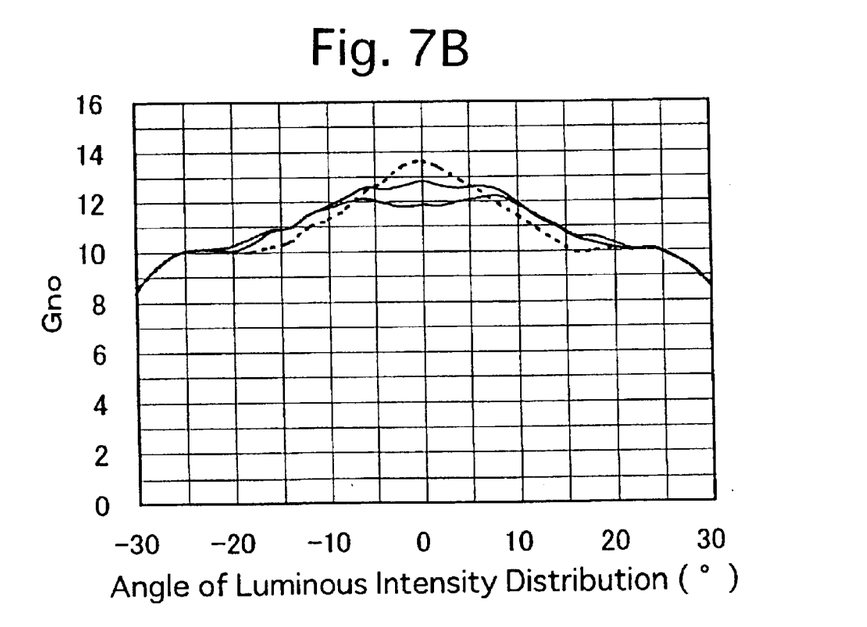
FIG. 7B is a graph showing three different curves each representing the variation of guide number in a vertical direction of the flash device shown in FIG. 1.

FIG. 7A shows three different curves (indicated by a broken line, a thick solid line and a thin solid line) each representing the variation of the guide number in a lateral direction of the flash device 10 when the upper and lower front movable reflectors 5a2 are positioned in the respective initial positions, when the upper and lower front movable reflectors 5a2 have been parallel-translated to widen the space therebetween, and when the upper and lower front movable reflectors 5a2 have been parallel-translated to narrow the space therebetween, respectively. FIG. 7B shows three different curves (indicated by a broken line, a thick solid line and a thin solid line) each representing the variation of the guide number in a vertical direction of the flash device 10 when the upper and lower front movable reflectors 5a2 are positioned in the respective initial positions, when the upper and lower front movable reflectors 5a2 have been parallel-translated to widen the space therebetween, and when the upper and lower front movable reflectors 5a2 have been parallel-translated to narrow the space therebetween, respectively. In FIGS. 7A and 7B, the horizontal axis represents the angle of luminous intensity distribution when the center of the lens is taken as an point of origin, while the vertical axis represents the guide number. As can be understood from FIGS. 7A and 7B, the guide number with respect to the angle of luminous intensity distribution increases when the upper and lower front movable reflectors 5a2 have been parallel-translated to widen the space therebetween, and decreases when the upper and lower front movable reflectors 5a2 have been parallel-translated to narrow the space therebetween. Additionally, even when the guide number is increased to increase the power of the flash device for telephoto photography, the luminous intensity of flash light does not drop largely at the marginal rays compared with a typical zoom flash device in which one of the reflector and the lens is movable relative to the other.

In the case where the above illustrated embodiment of the flash device according to the present invention is mounted on a camera using a zoom lens, the pair of front movable reflectors 5a2 can be parallel-translated in accordance with the focal length of the zoom lens. In the case where the above illustrated embodiment of the flash device according to the present invention is mounted on a camera using a fixed focal length lens, the pair of front movable reflectors 5a2 can be moved for the purpose of adjusting the cover angle of view of the flash device in an assembling operation. Namely, the above illustrated embodiment of the flash device according to the present invention can serve as not only a zoom type flash device but also a non-zoom type flash device.

Although a portion of the reflector 5 on the front end aperture 5d side in each lateral reflector plate portion 5a is formed as a movable reflector (the front movable reflector 5a2) in the above illustrated embodiment of the flash device, the dimensions of each movable reflector can be freely determined. The entire portion of each lateral reflector plate portion 5a can be formed as a movable reflector.

The flash tube 1 can not only be a xenon flash tube but also any other type flash tube. As can be understood from the foregoing, according to the present invention, a flash device which can adjust the flash coverage without changing the space between the lens and the reflector with a minimum reduction in luminous intensity of the marginal rays of flash light is achieved.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A flash device comprising:

a flash tube;

a reflector having a first reflector portion and a second reflector portion which are arranged symmetrically with respect to a plane including an axis of said flash tube, a space between said first reflector portion and said second reflector portion increasing in a direction toward a front end aperture of said reflector; and a lens positioned so as to be opposed to said front end aperture of said reflector, wherein at least a part of said first reflector portion on a side of said front end aperture and at least a part of said second reflector portion on a side of said front end aperture are interlocked with each other to be movable in opposite directions along a direction perpendicular to said plane.

2. The flash device according to claim 1, wherein said part of said first reflector portion and said part of said second reflector portion parallel-translate in said opposite directions.

3. The flash device according to claim 1, wherein said first reflector portion comprises a first rear stationary reflector and a first front movable reflector, wherein said second reflector portion comprises a second rear stationary reflector and a second front movable reflector, wherein said first front movable reflector and said second front movable reflector are interlocked with each other to be movable in said opposite directions along said direction perpendicular to said plane, wherein said first and second front movable reflectors parallel-translate in said opposite directions.

4. The flash device according to claim 1, wherein said reflector comprises two end reflector plate portions positioned at opposite ends of said flash tube, respective front ends of said two end reflector plate portions, said first reflector portion and said second reflector portion forming a substantially rectangular front end aperture of said reflector.

* * * * *